April 17, 1934.    E. O. McHENRY ET AL    1,955,197
TRACTOR WHEEL
Filed Feb. 14, 1933
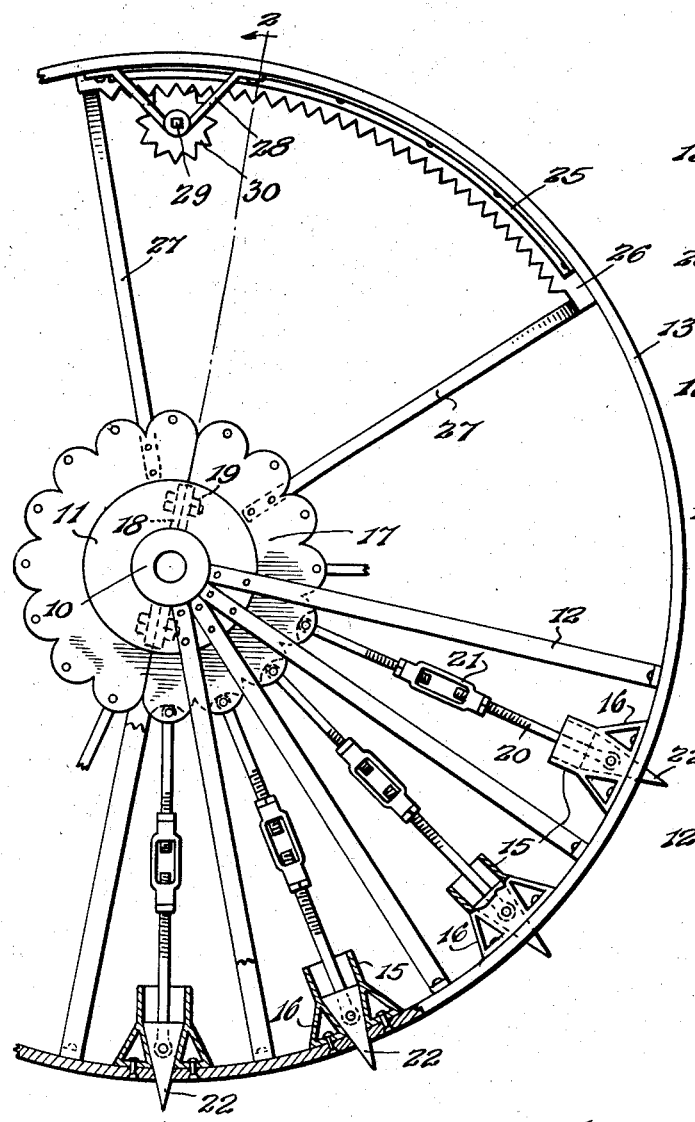
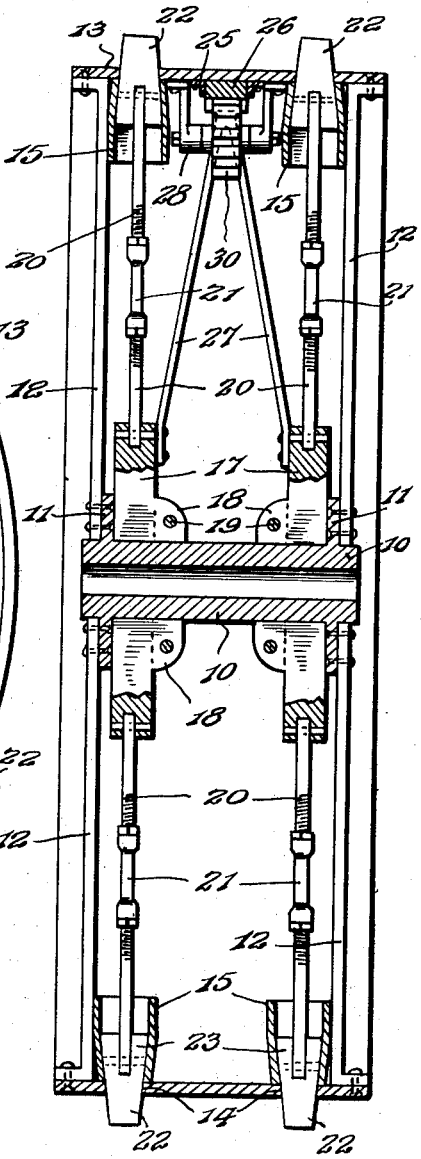
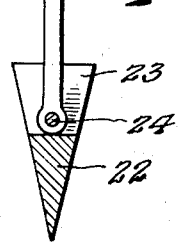
Inventors
E. O. McHenry.
J. F. Noble.
By Lacey & Lacey,
Attorneys Patented Apr. 17, 1934

1,955,197

UNITED STATES PATENT OFFICE 1,955,197

TRACTOR WHEEL

Earl O. McHenry, Hoytville, and James F. Noble, Custar, Ohio

Application February 14, 1933, Serial No. 656,734

1 Claim. (Cl. 301—46)

This invention relates to an improved tractor wheel or the like and seeks, among other objects, to provide a wheel having traction lugs thereon which may be adjusted to suit the exigencies of the surface over which the wheel travels.

A further object of the invention is to provide a wheel wherein the traction lugs may be adjustably projected to extend radially of the wheel rim or may be retracted so that the points of the lugs lie within the periphery of the rim.

And the invention seeks, as a still further object, to provide a wheel wherein the adjusting means for the lugs will be disposed close within the inner circumference of the rim and wherein the traction lugs, when projected, will be solidly supported.

Other and incidental objects of the invention, not specifically mentioned in the foregoing, will be apparent during the course of the following description.

In the accompanying drawing:

Figure 1 is a fragmentary side elevation of our improved tractor wheel,

Figure 2 is a vertical sectional view on the line 2—2 of Figure 1, and

Figure 3 is a detail sectional view showing one of the traction lugs.

Referring now more particularly to the drawing, the wheel hub is shown at 10 and surrounding the hub are spaced radial flanges 11 to which are appropriately secured spokes 12. Supported by the spokes in concentric relation to the hub is a rim 13 preferably flat and smooth at its inner and outer peripheries, the spokes being secured to the rim near the side edges thereof.

At each of its side margins, the rim 13 is provided with an annular series of circumferentially spaced openings 14 and fixed to the inner circumference of the rim to register with said openings, are guide sleeves 15. As will be observed, the outer end portions of these guide sleeves are substantially frusto-pyramidal in shape while the inner end portions of said sleeves are straight and square, and formed on the smaller ends of the sleeves at the front and rear thereof are triangular skeleton bracing brackets 16 the lateral legs of which are curved to fit the inner circumference of the rim and are riveted or otherwise fixed thereto for firmly connecting the sleeves with the rim. The smaller ends of the sleeves thus provide tapered sockets at the inner sides of the openings 14 having the walls thereof converging toward said openings.

Rotatably fitting about the end portions of the hub 10 to abut the flanges 11 are disks 17 the peripheries of which are preferably scalloped. These disks are each formed of mating complemental semicircular sections on the inner sides of which are provided mating flanges 18, and extending through said flanges are bolts 19 securing the sections together.

Pivotally connected at their inner ends to the peripheries of the disks 17 at the scallops thereon are rods 20 in which are interposed turnbuckles 21 so that the length of said rods may be adjusted, and swingingly mounted upon the outer ends of the rods are pyramidal traction lugs 22. As shown in detail in Figure 3, these lugs are recessed at their inner ends to provide spaced wings 23 between which the outer ends of the rods 20 are freely received and extending through said rods and through the wings are pins 24 pivotally connecting the lugs to the rods. As best brought out in Figure 1, the lugs 22 are slidably accommodated in the sleeves 15 at the inner periphery of the wheel rim and are so shaped that when said lugs are projected to active position extending beyond the outer periphery of the rim, said lugs fit snugly in the sockets provided by the tapered outer ends of said sleeves, or, in other words, are wedged in said sockets so that the sleeves will firmly coact with the lugs for rigidly supporting the lugs in active position.

Fixed to the inner periphery of the wheel rim, at any suitable point therealong, are spaced guide flanges 25 and slidable between said flanges is a rack bar 26 curved to fit the curvature of the rim. Formed on, or otherwise secured to, the bar at its ends are pairs of straps 27 which, as best seen in Figure 2, are riveted or otherwise secured to the disks 17 at their inner sides, the straps of each pair diverging to lie at their inner ends against the inner faces of the disks. Thus, the rack bar 26 is rigidly connected with said disks. Fixed to the inner periphery of the wheel rim 13, at opposite sides of the flanges 25, are alined brackets 28 located near one end of the rack bar, and journaled through said brackets is a shaft 29 both ends of which are preferably squared to accommodate a wrench. Fixed to the shaft between the brackets is a pinion 30 meshing with the rack bar 26.

As will now be seen, the shaft 29 may be turned for rotating the pinion 30 when the rack bar 26 will be shifted along the inner circumference of the wheel rim 13 for rotating the disks 17. As will be appreciated, rotation of said disks in one direction will cause the traction lugs 22 to be retracted and in this connection, attention is directed to the fact that said lugs may thus be shifted to inactive position when the tips of the lugs will be disposed within the outer circumference of the wheel rim. In this inactive position of the lugs, the straight inner ends of the sleeves 15 will coact with the inner ends of the lugs for retaining the lugs within the sleeves. On the other hand, by rotating the disks 17 in the opposite direction, the traction lugs 22 may be projected to active position, as shown in the drawing, when the tips of the lugs will extend beyond the periphery of the wheel rim to contact the road surface, the lugs being rigidly supported in active position by the sleeves 15.

Having thus described the invention, we claim:

A traction wheel comprising a hub, a rim, spokes connecting the hub and the rim, disks rotatably mounted on the hub, guide flanges extending circumferentially on the inner surface of the rim, a rack bar slidably held by and between said flanges, rigid straps connecting the ends of the rack bar with the disks, bearing brackets on the rim, a pinion rotatably carried by the rim and meshing with the rack bar, traction lugs slidable through the rim, and connections between the lugs and the disks.

EARL O. McHENRY. [SEAL.]
JAMES F. NOBLE. [SEAL.]